(12) United States Patent
Mazzarelli et al.

(10) Patent No.: US 11,685,244 B2
(45) Date of Patent: Jun. 27, 2023

(54) COVER FOR A VEHICLE

(71) Applicant: Commercial Sewing, Inc., Torrington, CT (US)

(72) Inventors: David Mazzarelli, Torrington, CT (US); Sean Michael Kinne, Torrington, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 631 days.

(21) Appl. No.: 16/653,234

(22) Filed: Oct. 15, 2019

(65) Prior Publication Data
US 2020/0114746 A1   Apr. 16, 2020

Related U.S. Application Data

(60) Provisional application No. 62/745,850, filed on Oct. 15, 2018.

(51) Int. Cl.
*B60J 11/00* (2006.01)

(52) U.S. Cl.
CPC ..................... *B60J 11/00* (2013.01)

(58) Field of Classification Search
CPC ....................................... B60J 11/00
See application file for complete search history.

(56) References Cited

U.S. PATENT DOCUMENTS

| | | | | |
|---|---|---|---|---|
| 2,455,237 A * | 11/1948 | Davis | ................... | B60P 7/0876 410/97 |
| 2,465,621 A * | 3/1949 | Wheeler | ................... | B60J 7/104 267/74 |
| 6,003,929 A * | 12/1999 | Birdsell | ................... | B60P 7/0876 52/3 |
| 7,458,333 B2 * | 12/2008 | Yang | ................... | B60J 7/104 296/100.18 |
| 7,806,069 B2 * | 10/2010 | Bryant | ................... | B63B 17/00 114/361 |

* cited by examiner

*Primary Examiner* — Tri M Mai
(74) *Attorney, Agent, or Firm* — Cantor Colburn LLP

(57) ABSTRACT

A clip assembly includes a base plate having an elongated slot, and a rail clip positioned adjacent the base plate. The rail clip is movable within the elongated slot. A locking mechanism is mounted to the base plate and is operably coupled to the rail clip.

11 Claims, 11 Drawing Sheets

FIG. 5

COVER FOR A VEHICLE

CROSS REFERENCE TO RELATED APPLICATIONS

The application claims the benefit of U.S. Provisional Application No. 62/745,850, filed Oct. 15, 2018, which is incorporated herein by reference in its entirety.

BACKGROUND

Certain recreational vehicles, for example snowmobiles, are normally covered with protective covers during storage or when they are being towed by another vehicle. The covers provide protection against the elements of nature, such as the sun, snow and dirt.

Typically, such covers are designed to snugly fit over the particular vehicle to be covered. Soft, lightweight covers are often used as they can easily be folded up and stored away when not in use. Such covers generally comprise a large body made of nylon or a similarly weatherproof material which is sized and fitted to slip over the top of the entire upper body portion of the vehicle. In the example of a snowmobile, the cover generally covers the forward fairings of the external shell and the seat portion.

A system of straps or attachments is commonly used to secure the cover to the vehicle. Typically, when the user wants to cover the vehicle, he disposes the cover over the vehicle and reaches under the vehicle for securing the attachment straps thereunder. In some cases, the straps are also to be secured around the suspension elements. When doing so, the user may get dirty due to the snow and/or dirt accumulated under and over the vehicle. Furthermore, to perform the operation, the user usually lowers at least one knee on the ground, which can cause discomfort. When the user wants to remove the cover, he has to undo all the straps in a similar way and therefore with the same inconveniences.

SUMMARY

According to an embodiment, a clip assembly includes a base plate having an elongated slot, and a rail clip positioned adjacent the base plate. The rail clip is movable within the elongated slot. A locking mechanism is mounted to the base plate and is operably coupled to the rail clip.

In addition to one or more of the features described above, or as an alternative, in further embodiments comprising a webbing member extending between the rail clip and the locking mechanism, wherein the locking mechanism is operable to apply a force to the webbing member to restrict movement of the webbing member and the rail clip relative to the base plate.

In addition to one or more of the features described above, or as an alternative, in further embodiments the base plate has a first side and a second side, opposite the first side, the rail clip being positioned adjacent the first side and the locking mechanism being positioned adjacent the second side.

In addition to one or more of the features described above, or as an alternative, in further embodiments a webbing opening is formed in the base plate, the webbing member extending through the webbing opening.

In addition to one or more of the features described above, or as an alternative, in further embodiments the locking mechanism includes a locking member movable relative to the base plate between a first position and a second position, wherein the locking member applies a force to the webbing member when the locking member is in the second position.

In addition to one or more of the features described above, or as an alternative, in further embodiments the locking member is rotatable about an axis oriented substantially perpendicular to the elongated slot and parallel to a surface of the base plate.

In addition to one or more of the features described above, or as an alternative, in further embodiments the locking member includes a cam surface.

In addition to one or more of the features described above, or as an alternative, in further embodiments the rail clip is contoured to define a chamber for receiving a portion of a recreational vehicle.

In addition to one or more of the features described above, or as an alternative, in further embodiments the clip assembly is affixed to a cover.

According to another embodiment, a cover for a recreational vehicle includes a cover body and at least one clip assembly affixed to the cover body. The at least one clip assembly includes a rail clip movable to engage a corresponding portion of the recreational vehicle and a locking mechanism operably coupled to the rail clip to maintain a tension in the cover body.

In addition to one or more of the features described above, or as an alternative, in further embodiments further comprising a webbing member extending between the rail clip and the locking mechanism.

In addition to one or more of the features described above, or as an alternative, in further embodiments the at least one clip assembly further comprises a base plate having an elongated slot, the rail clip being movable within the elongated slot.

In addition to one or more of the features described above, or as an alternative, in further embodiments the base plate has a first side and a second side, opposite the first side, the rail clip being positioned adjacent the first side and the locking mechanism being positioned adjacent the second side.

In addition to one or more of the features described above, or as an alternative, in further embodiments a webbing opening is formed in the base plate, the webbing member extending through the webbing opening.

In addition to one or more of the features described above, or as an alternative, in further embodiments the locking mechanism includes a locking member movable relative to the base plate between a first position and a second position, wherein the locking member is operable to apply a force to the webbing member to maintain the tension in the webbing member.

In addition to one or more of the features described above, or as an alternative, in further embodiments the locking member is rotatable about an axis oriented substantially perpendicular to the elongated slot and parallel to a surface of the base plate.

In addition to one or more of the features described above, or as an alternative, in further embodiments the locking member includes a cam surface.

In addition to one or more of the features described above, or as an alternative, in further embodiments the cam surface applies the force to the webbing member when the locking member is in the second position.

In addition to one or more of the features described above, or as an alternative, in further embodiments the locking member is biased into engagement with the webbing member.

In addition to one or more of the features described above, or as an alternative, in further embodiments the rail clip is contoured to define a chamber for receiving a portion of a recreational vehicle.

According to yet another embodiment, a method of installing a cover about a recreational vehicle includes positioning a cover in overlapping arrangement with the recreational vehicle, the cover including at least one clip assembly having a rail clip and a locking mechanism, applying a force to a webbing member coupled to the rail clip to move the rail clip into engagement with a portion of the recreational vehicle, applying an additional force to the webbing member to tighten the cover about the recreational vehicle and clamping the webbing member via the locking mechanism to restrict movement of the webbing member.

In addition to one or more of the features described above, or as an alternative, in further embodiments clamping the webbing member includes rotating the locking mechanism about an axis from a first position to a second position.

According to another embodiment, a cover for a vehicle includes a cover body and at least one clip assembly including a base plate affixed to the cover body and a rail clip mountable to the vehicle. The rail clip is selectively connected to the base plate to restrict movement of the cover body relative to the vehicle.

In addition to one or more of the features described above, or as an alternative, in further embodiments comprises at least one locking opening and the rail clip further comprises at least one locking feature, the at least one locking feature being receivable within the at least one locking opening.

DETAILED DESCRIPTION

Figure 1:
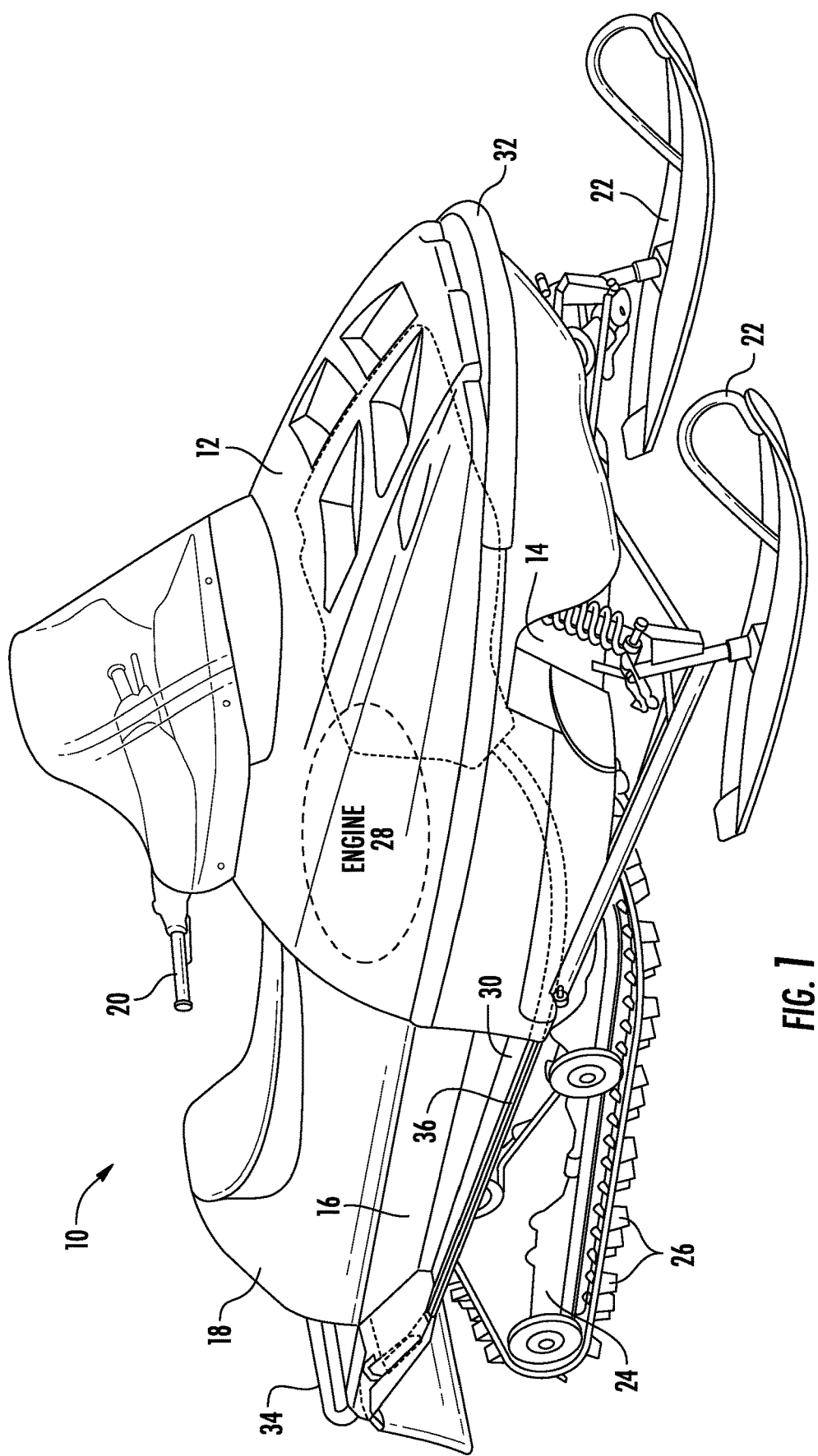
FIG. 1 is a left side elevation view of an example of a snowmobile with a user thereon.

Referring now to FIG. 1, an example of a snowmobile is illustrated. As shown, the snowmobile 10 includes a body 12 made up of a number of parts which may be formed of suitable materials that cover and protect a support frame or chassis 14. The body 12 further includes a rear body portion 16 that accommodates a seat 18 adapted to seat one or more riders in straddle fashion. A handlebar assembly 20, positioned forwardly of the seat, is conventionally connected to a pair of skis 22 for steering the snowmobile. The skis 22 are supported by a suitable front suspension system that is connected to the chassis 14.

Rearwardly of the skis 22 and beneath the seat 18, the chassis 14 suspends an endless track 24 by a suitable suspension. The endless track 24 has a plurality of spaced ribs 26 which extend from the exterior surface of the track. These ribs 26 not only provide traction to the endless track 24 but, as will be described below, assist in providing added cooling to the improved cooling system. The endless track 24 is driven by an internal combustion engine, indicated generally at 28, that is supported by the chassis 14 and located in an engine compartment (not shown) within the body 12 towards the front of the snowmobile 10.

Beneath the seat 18 and disposed around the endless track 24, the snowmobile 10 has a longitudinally extending drive tunnel support frame (not shown) supported by the chassis 14. The drive tunnel can be made of a thermally conductive material such as aluminum. The drive tunnel has a top portion (not shown) under the seat 18. The top portion connects to generally downwardly extending sidewalls (not shown) that are positioned on opposite sides of the endless track 24 so that the endless track is disposed within the drive tunnel. Generally horizontal foot rails 30 (only the right foot rail is shown) extend outward from the chassis 14, or they extend outward from each sidewall 36, 38, respectively. The foot rails 30 can be made of a thermally conductive material and can be formed integrally with the drive tunnel (and therefore being thermally conductive therewith). The width of the foot rails 30 may tapers rearwardly. In addition, the foot rails 30 may include a plurality of gripping elements to limit slippage between a user's foot and the foot rail. The snowmobile illustrated and described herein is intended as an example only, and it should be understood that a snowmobile having another configuration is also within the scope of the disclosure.

Figure 2:
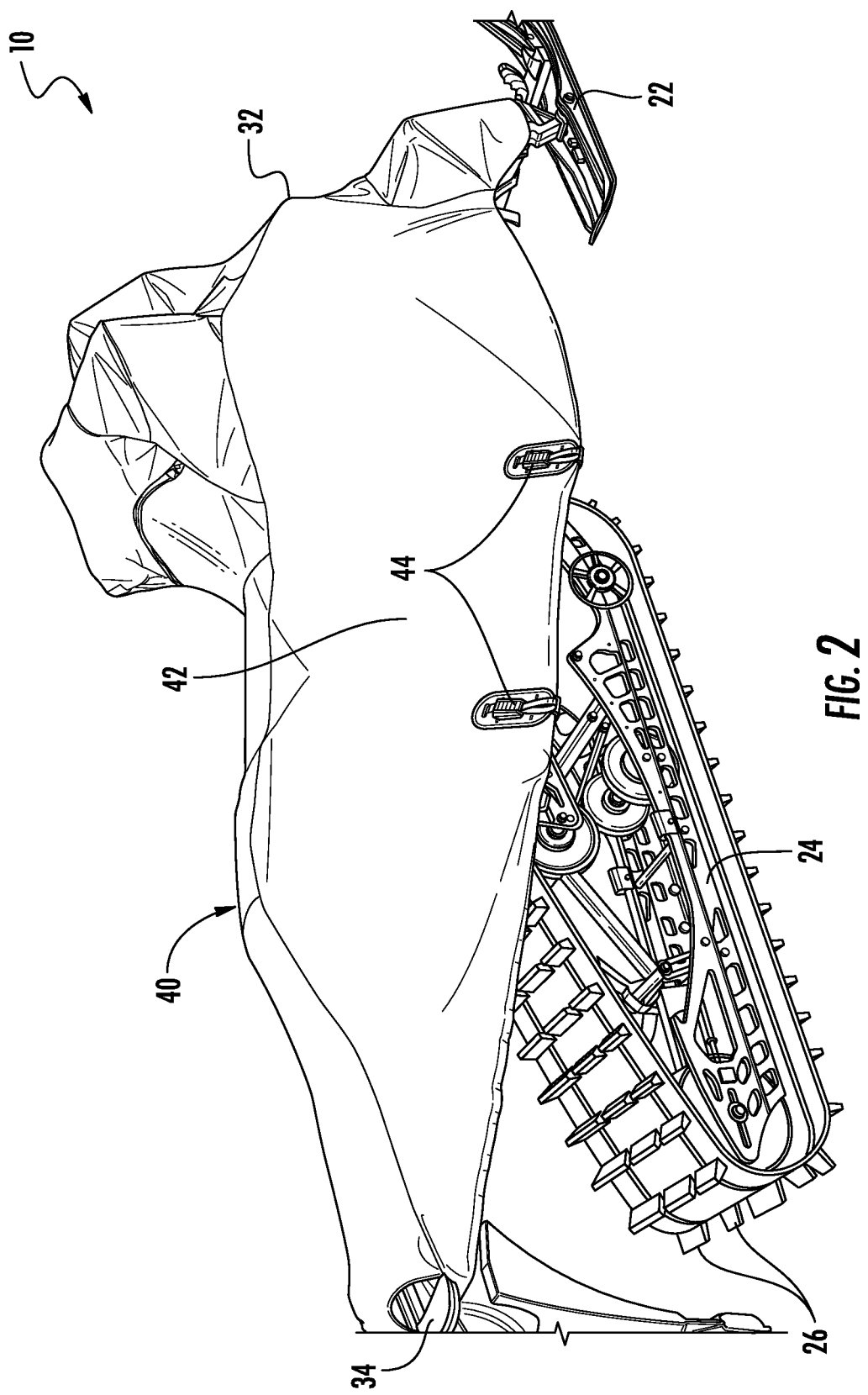
FIG. 2 is a rear perspective view of a snowmobile having a cover installed thereon.

With reference now to FIG. 2, an example of a protective cover 40, according to an embodiment, for covering a recreational vehicle, such as snowmobile 10, is illustrated. The cover 40 is shown and described herein as applied to the snowmobile 10 for explanatory purposes only. It shall be understood that the cover 40 of the present disclosure may be applied to any recreational vehicle including, but not limited to, boats and other personal watercraft, automobiles, bicycles, motorcycles, and/or other items.

The removable cover 40 is positionable over the snowmobile 10 when the snowmobile 10 is not in use. The cover 40 is intended to protect the snowmobile 10 from elements of nature (snow, dirt, sun, etc.). The cover 40, when installed about the snowmobile 10 as shown in FIG. 2, generally covers the snowmobile 10 longitudinally from a front 32 to the rear 34, and laterally from the edge of the left foot rest (not shown) to the edge 36 of the right foot rail 30. However, it is contemplated that the cover 40 could cover more or less of the snowmobile 10. It is also contemplated that more than one cover could be used or that the cover 40 could be made of multiple sections selectively connected to each other.

The cover 40 includes a cover body 42 and a plurality of clip assemblies 44 disposed along the sides of the cover body 42 for tightening the cover 40 to the snowmobile 10. The cover body 42 may be made from an air impermeable material which is dimensioned and configured to conform closely to a portion of the snowmobile 10. In an embodiment, the cover 40 is formed from a polyester material, resistant to wind and to freezing temperatures. However, it is contemplated that the cover 40 could be made of other materials such as cotton, nylon or other similar materials. The cover 40 is flexible and can be folded for storage when the snowmobile 10 is in use.

With reference now to FIGS. 3-11, various embodiments of the clip assemblies 44 associated with the cover body 42 and used to affix and tighten the cover 40 about the snowmobile 10 are illustrated. Each clip assembly 44 includes a base plate 46 formed from any suitable material, such as plastic or metal for example. In the illustrated, non-limiting embodiment of FIGS. 3-7, an elongated through slot 48 is formed in the base plate 46. The elongated slot 48 extends longitudinally relative to the base plate 46 and has a length less than the length of the base plate 46. The base plate 46 may be affixed to either an inner surface or an outer surface of the cover 40 adjacent an opening similar to the slot 48 formed in the cover body 42. In an embodiment, the base plate 46 is sewn to the cover body 42, however, any suitable connection between the base plate 46 and the cover body 42 is contemplated herein. In other embodiments, the base plate 46 may be defined by a first base plate mounted to an inner surface of the cover body 42 and a second base plate mounted to the outer surface of the cover body 42 in alignment with the first base plate.

A rail clip 50 is positioned adjacent a first side 52 of the base plate 46. In an embodiment, the first side 52 of the base plate 46 is arranged adjacent an interior surface of the cover body 42. The rail clip 50 has a generally curved or hook-like contour that defines a receiving chamber 54. The rail clip 50 is configured to couple to the snowmobile 10 by receiving a component of the snowmobile 10 within the receiving chamber 54. In an embodiment, the rail clip 50 is configured to couple to a bottom surface and/or outer edge 36 of a foot rail 30 of the snowmobile 10. However, embodiments where the rail clip 50 affixes to another portion of the snowmobile 10 are also within the scope of the disclosure.

Figure 3:
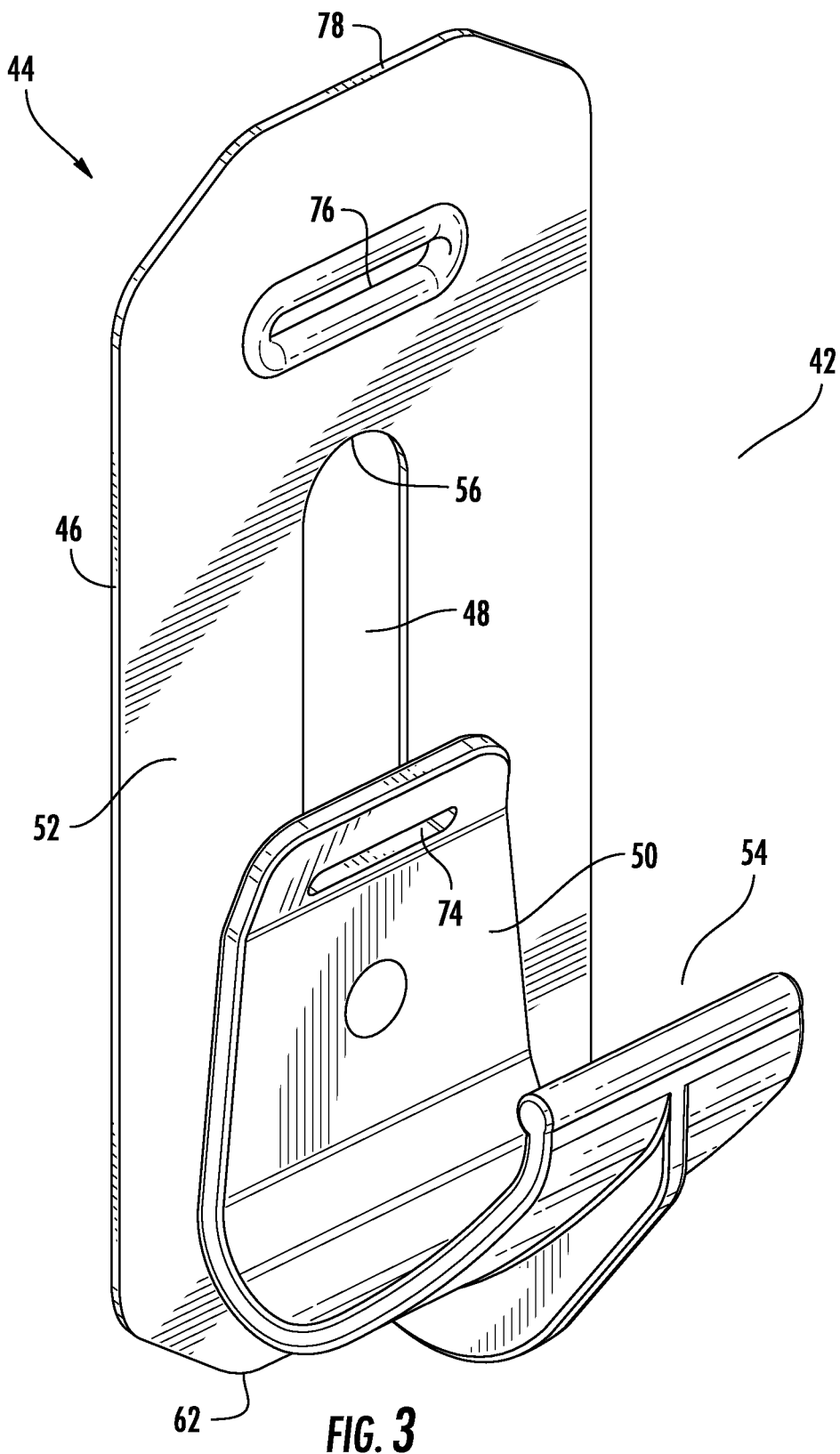
FIG. 3 is a perspective view of a portion of a clip assembly of a cover according to an embodiment.

The rail clip 50 is movably coupled to the base plate 46. In an embodiment, a protrusion (not shown) extends from the rail clip 50 through the elongated slot 48 formed in the base plate 46. An end of the protrusion may have one or more dimensions greater than the slot 48 to prevent movement of the rail clip 50 out of the plane defined by the first side 52 of the base plate 46. The rail clip 50 is movable, for example slidable, between a first position adjacent a first end (not shown) of the slot 48, as shown in FIG. 3, and a second position where the rail clip 50 is arranged adjacent the second, opposite end 56 of the slot 48.

A locking mechanism 60 is mounted adjacent a second, opposite side 58 of the base plate 46. In the non-limiting embodiment of FIGS. 3-5, the locking mechanism 60 is disposed generally centrally about the base plate 46. However, in the embodiment illustrated in FIG. 6, the locking mechanism 60 is disposed adjacent an end 62 of the base plate 46. Accordingly, the locking mechanism 60 may be mounted at any suitable position about the second side 58 of the base plate 46.

In an embodiment, a portion of the locking mechanism 60, such as the portion mounted to the second side 58 of the base plate 46 for example, defines an adjustment track adjacent the second side 58 of the base plate 46. A width of the adjustment track is greater than the width of the elongated slot 48. In an embodiment, the end of the protrusion extending from the rail clip 50 is receivable within the adjustment track as the rail clip 50 translates between the first position and second position. Further, the end of the protrusion is movable within the adjustment track without interfering with operation of the locking mechanism 60.

Figure 4:
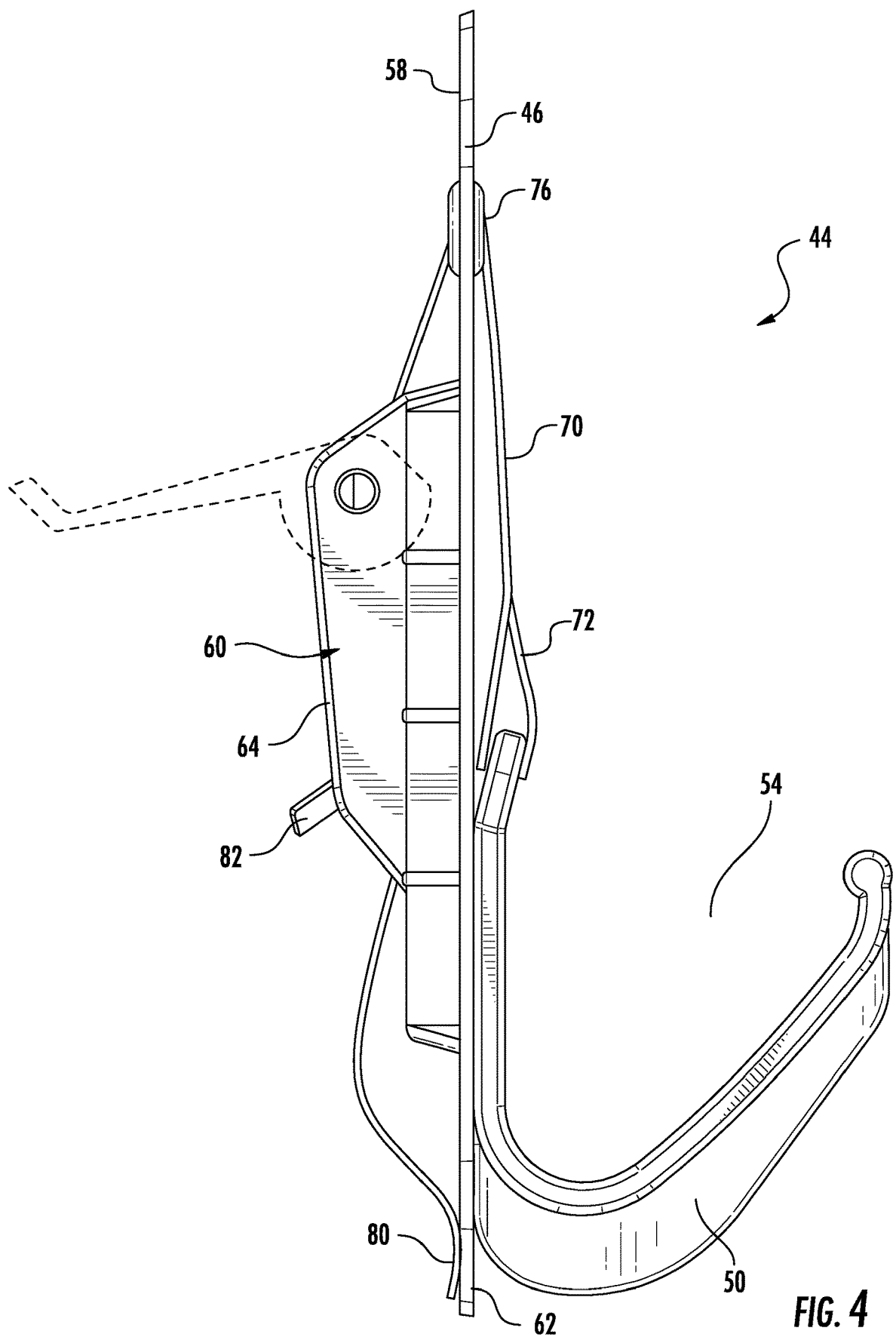
FIG. 4 is a side view of a clip assembly of a cover according to an embodiment.
Figure 5:
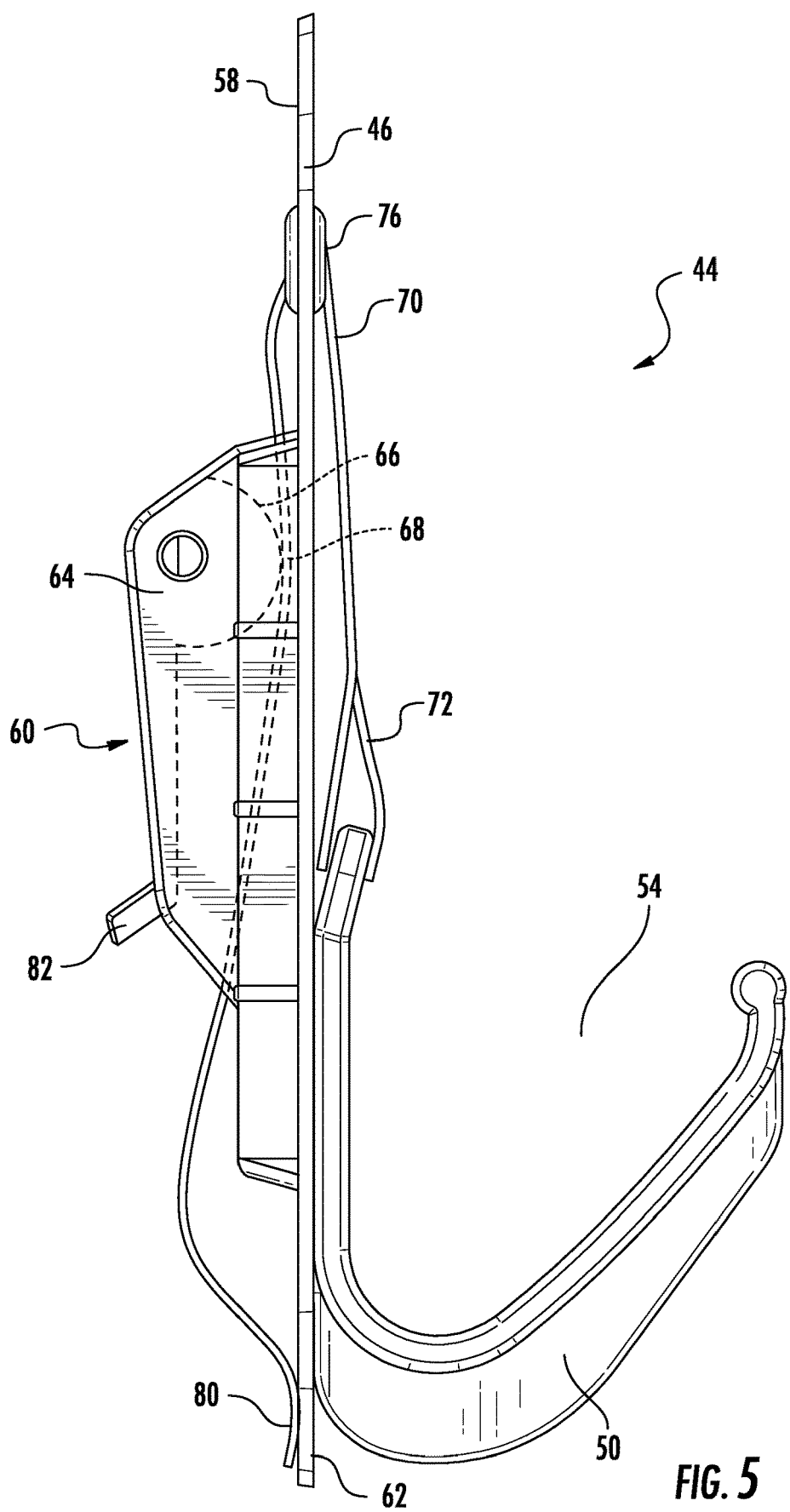
FIG. 5 is another side view of a clip assembly of a cover according to an embodiment.
Figure 6:
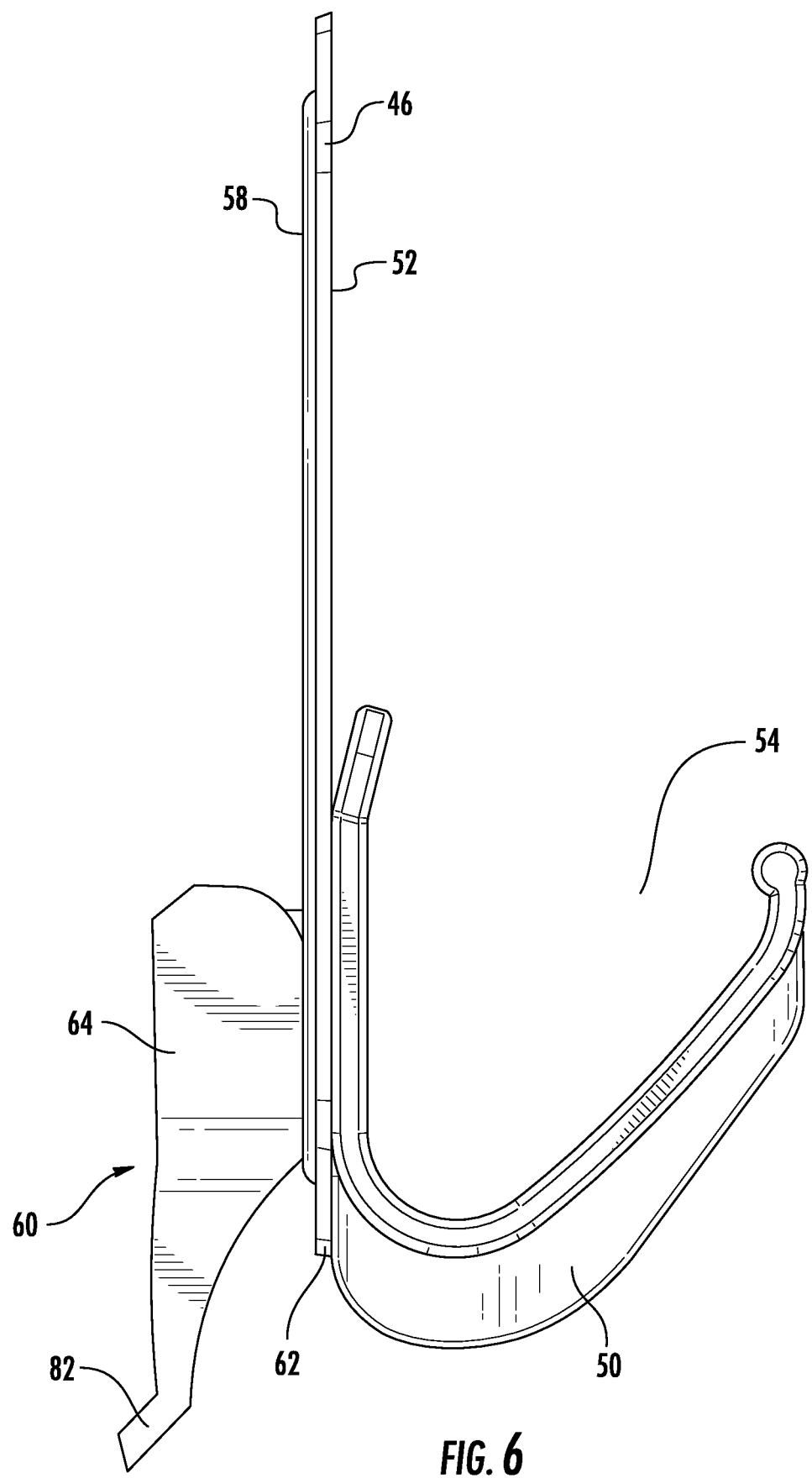
FIG. 6 is a side view of another clip assembly of a cover according to an embodiment.

The locking mechanism 60 includes a locking member 64. In the illustrated, non-limiting embodiments, the locking member 64 is coupled to a portion of the adjustable track. As shown in FIG. 4-5, the locking member 64 is rotatable about an axis X relative to the base plate 46 between an unlocked position and a locked position. The locking member 64 is typically arranged at an angle to the base plate 46 when in the first, unlocked position, and is arranged parallel to the base plate 46 when in the second, locked position. However, it should be understood that any type of movement of the locking mechanism relative to the base plate 46, such as rotation about an axis extending from the first side 52 to the second side 58 of the base plate 46, or translation relative to the base plate 46 is also within the scope of the disclosure.

In an embodiment (see FIG. 5), the locking member 64 may include a cam surface 66 disposed adjacent the second side 58 of the base plate 46. As the locking member 64 rotates from an unlocked position (illustrated in broken lines in FIG. 4) to a locked position (FIG. 4), the clearance 68 (best shown in FIG. 5) defined between the cam surface 66 of the locking member 64 and the adjacent second side 58 of the base plate 46 is gradually reduced.

The clip assembly 44 additionally includes at least one webbing member 70, such as a flexible strap or rope for example. As best shown in FIGS. 4 and 5, the webbing member 70 is coupled to the rail clip 50. A first end 72 of the webbing member 70 may be directly connected to the rail clip 50. Alternatively, the webbing member 70 may extend through an opening 74 (see FIG. 3) formed in the rail clip 50, and the first end 72 of the webbing member 70 may be affixed to itself to restrict movement of the rail clip 50 relative to the webbing member 70.

A webbing opening 76 is formed in the base plate 46 offset from the slot 48 and the locking mechanism 60. In an embodiment, the webbing opening 76 is vertically aligned with the slot 48, and is positioned between the slot 48 and an end 78 of the base plate 46. The webbing member 70 extends through the webbing opening 76 to the second side 58 of the side plate 46 where the webbing member 70 is selectively engagable with the locking mechanism 60. In an embodiment, the webbing member 70 generally extends through the clearance 68 formed between the base plate 46 and the locking member 64.

The clip assembly 44 is operable to tighten the cover 40 around a corresponding portion of the snowmobile 10. Once the cover 40 is positioned about the snowmobile 10, a force may be applied to the second, free end of the webbing member 70. The second free end 80 of the webbing member 70 is positioned generally adjacent the locking member. As the force is applied to the webbing member 70, the webbing member 70 applies a force to the rail clip 50, causing the rail clip 50 to translate within the slot 48 relative to the base plate 46. The rail clip 50 will translate relative to the base plate 46 until the rail clip 50 couples to a corresponding portion of the snowmobile 10, such as an outer edge 36 of the foot rail 30 for example (see FIG. 8). In an embodiment, the coupling is formed by receiving the edge 36 of the foot rail 30 within the chamber 54 defined by the rail clip 50. Once the rail clip 50 is connected to the snowmobile 10, application of an additional force to the webbing member 70 will cause the cover 40 to tighten about the snowmobile 10 because movement of the rail clip 50 is restricted via its engagement with the snowmobile 10.

In embodiments where the locking mechanism 60 includes a locking member 64 having a cam surface 66, during installation of the cover 40 about the snowmobile 10, the locking member 64 is typically in the first position such that the webbing member 70 can move freely relative to the base plate 46. Upon application of a force to the second end 80 of the webbing member 70 by a user, the cover 40 will tighten about the snowmobile 10. Once the cover 40 is sufficiently tight, the user may rotate the locking member 64 about its axis to the second position. As the locking member 64 rotates, the cam surface 66 of the locking member 64 engages and applies a force to the webbing member 70, thereby clamping the webbing member 70 between the locking member 64 and the second side 58 of the base plate 46. This pressure maintains the tension in the webbing member 70, thereby restricting movement of the rail clip 50 toward the first position, and the corresponding loosening of the cover 40. However, it should be understood that in other embodiments, a force may be applied to the second end 80 of the webbing member 70 to tighten the cover 40 when the locking member 64 is in the second position. To loosen the cover 40 about the snowmobile 10, the locking member 64 is rotated about its axis from the second position to the first position such that the webbing member 70 may move freely relative to the base plate 46.

In another embodiment, the second end 80 of the webbing member 70 may be coupled to the movable locking member 64. For example, the second end 80 may be directly affixed, such as to a distal end 82 of the locking member 64. Alternatively, the webbing member 70 may extend through an opening (not shown) formed in the locking member 64, and the second end 80 of the webbing member 70 may be affixed to itself to restrict movement of the webbing member 70 relative to the locking member 64. In embodiments where the webbing member 70 is coupled to the locking member 64, when the locking member 64 is in the first position, the webbing member 70 is slack such that the rail clip 50 is free to move relative to the slot 48. Upon rotation of the locking member 64 to the second position, the tension applied to the webbing member 70 will cause the rail clip 50 to translate relative to the slot 48 until the rail clip 50 engages a portion of the snowmobile 10. Similar to the previous embodiment, once the rail clip 50 engages the foot rail 30, further rotation of the locking member 64 to the second position, will cause the cover 40 to tighten about the snowmobile 10.

The tension in the webbing member 70 may be sufficient to retain the locking member 64 in the second position. Alternatively, a locking mechanism 60 may include a mechanism (not shown) for retaining the locking member 64 in the second rotated position to maintain the tension in the webbing member 70 and to prevent the cover 40 from loosening about the snowmobile 10.

Figure 7:
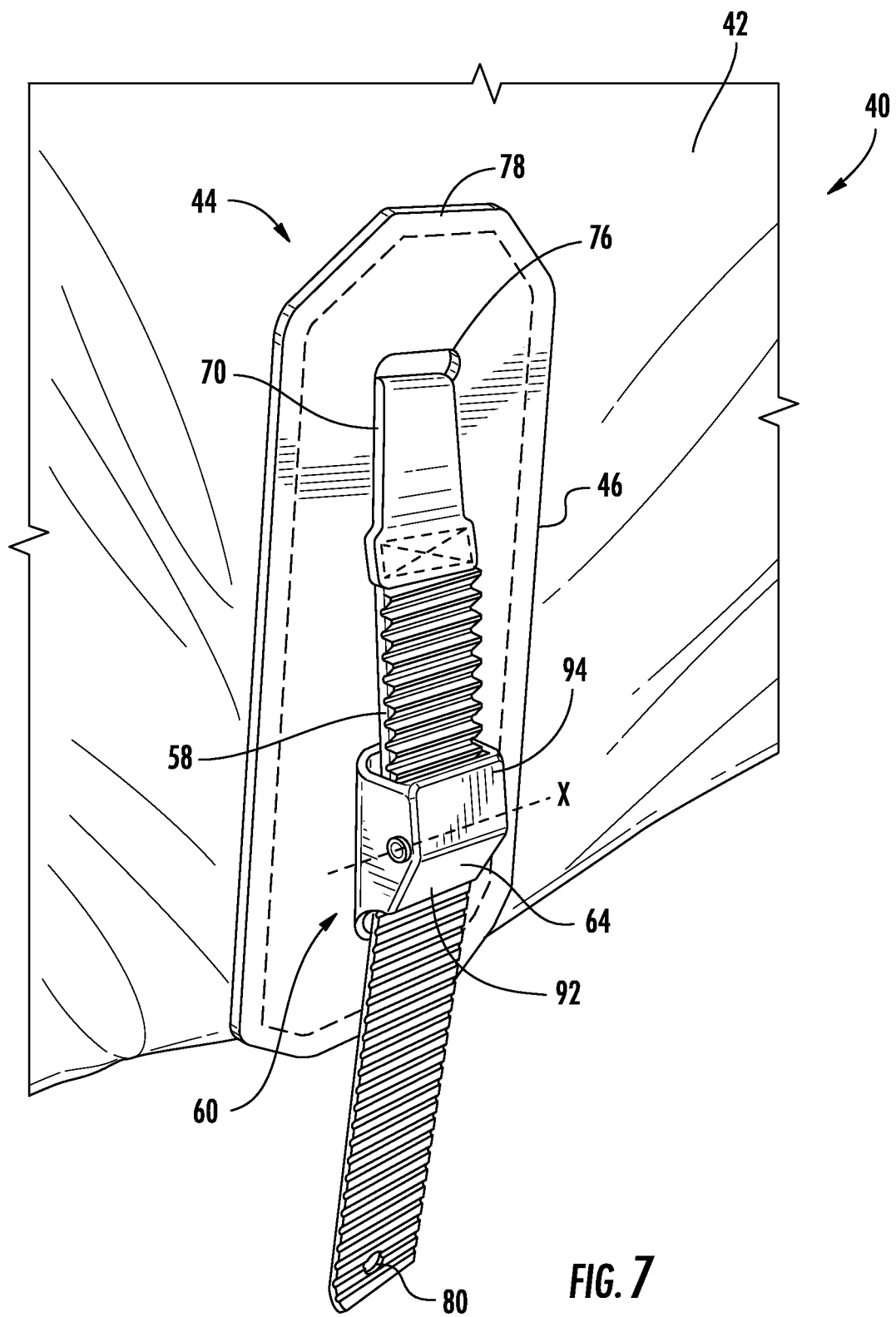
FIG. 7 is a perspective view of a clip assembly of a cover according to an embodiment.
Figure 8:
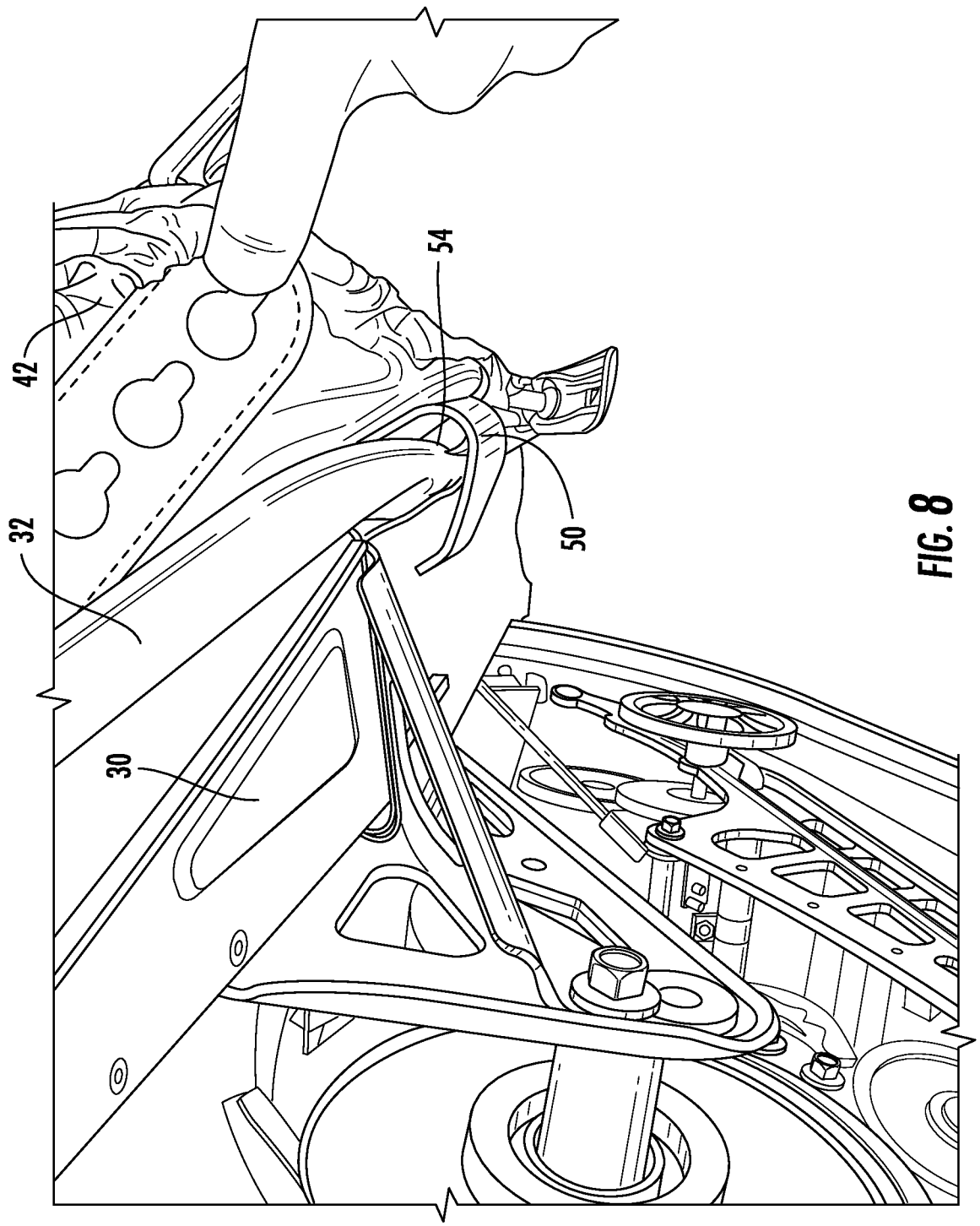
FIG. 8 is a perspective view of a rail clip of a cover assembly according to an embodiment.

In yet another embodiment, illustrated in FIG. 7, the locking member 64 is similarly rotatable about an axis oriented substantially perpendicular to the slot 48. As shown, the locking member 64 may be a clip that is biased by a biasing member (not shown) about the axis X into a first, engaged position. In the first position, a first end 92 of locking member 64 is arranged in contact with and applies a force to the second side 58 of the base plate 46. The locking member 64 may be rotated in a direction opposite the biasing force of the biasing mechanism, to a second position, via application of a force by a user to a second end 94 thereof. In the second position, a clearance (not shown) is formed between the second side 58 of the base plate 46 and the locking member 64. Accordingly, when the locking member 64 is in the first position, the first end 92 of the locking member 64 applies a force to the webbing member 70 to clamp the webbing member 70 in place, thereby restricting movement of the rail clip towards the first end of the slot 48, such as due to gravity. When the locking member 64 is in the second position, the webbing member 70 is freely movable relative to the locking mechanism 60.

It should be understood that a force may be applied to the second end 80 of the webbing member 70 to tighten the cover 40 about the snowmobile 10, when the locking member 64 is in either the first position or the second position. However, the tension of the webbing member 70 may only be released when the locking member 64 is in the second position.

Figure 9:
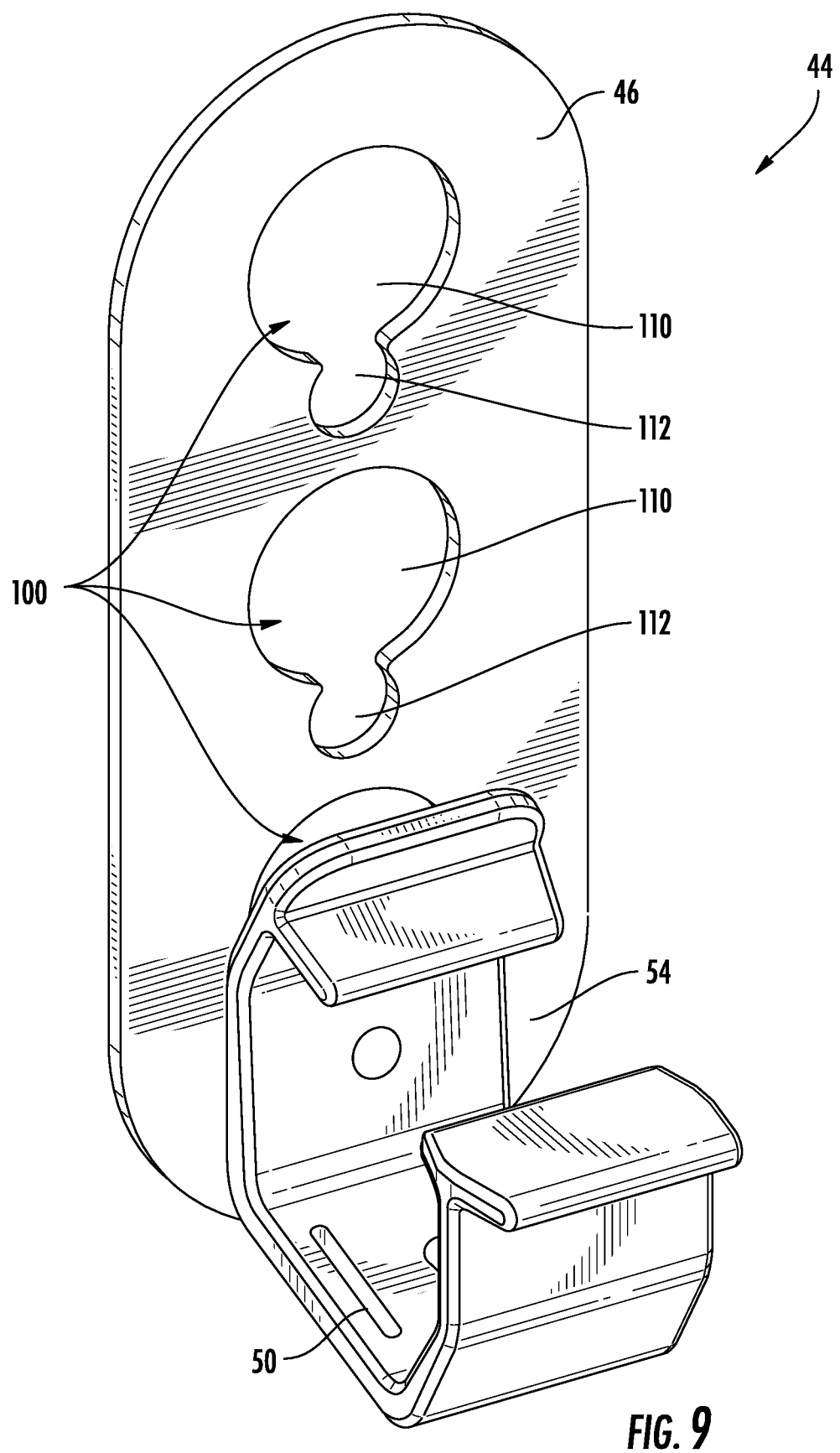
FIG. 9 is a front perspective view of clip assembly of a cover according to another embodiment.
Figure 10:
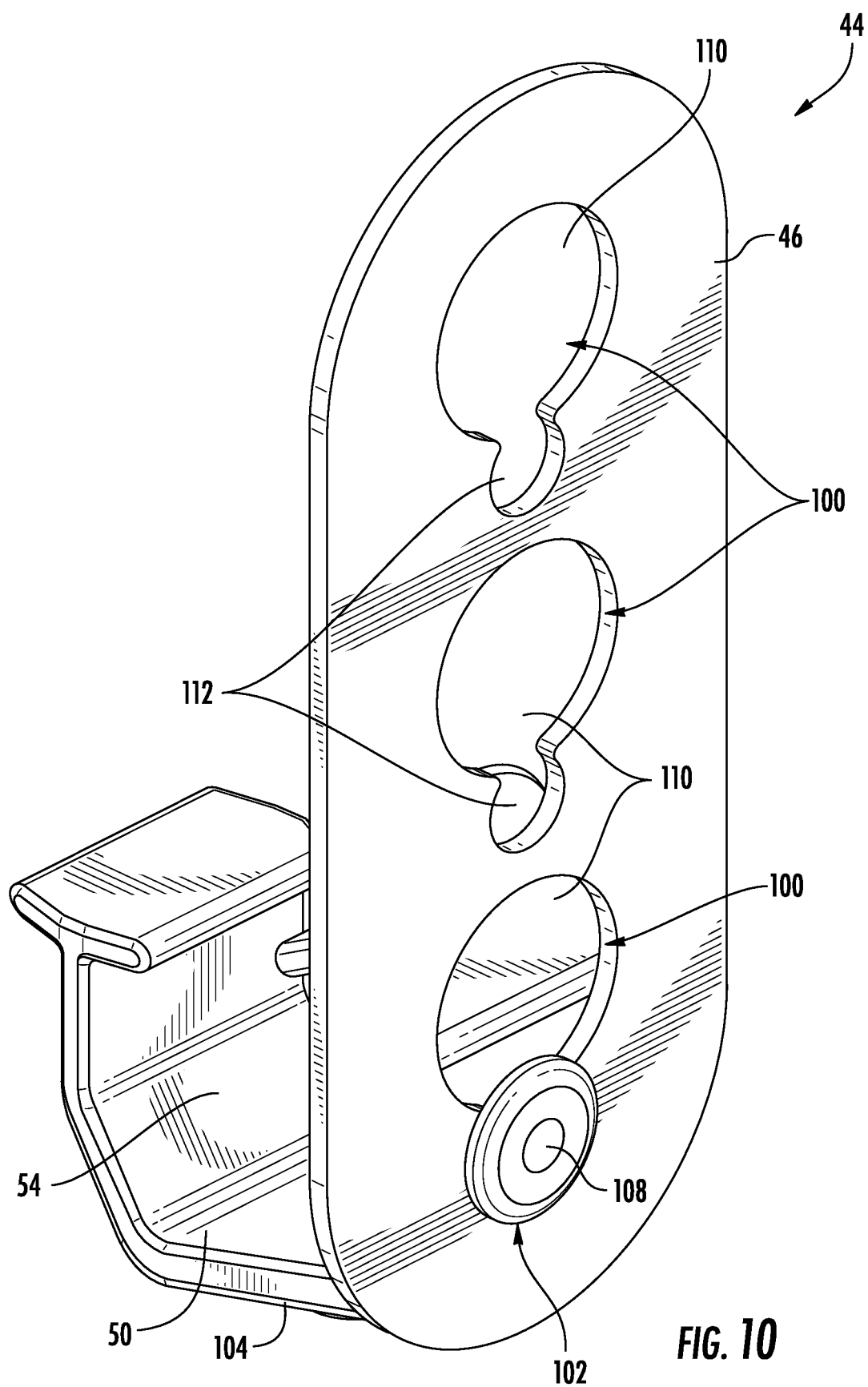
FIG. 10 is a back perspective view of a clip assembly of a cover according to an embodiment.
Figure 11:
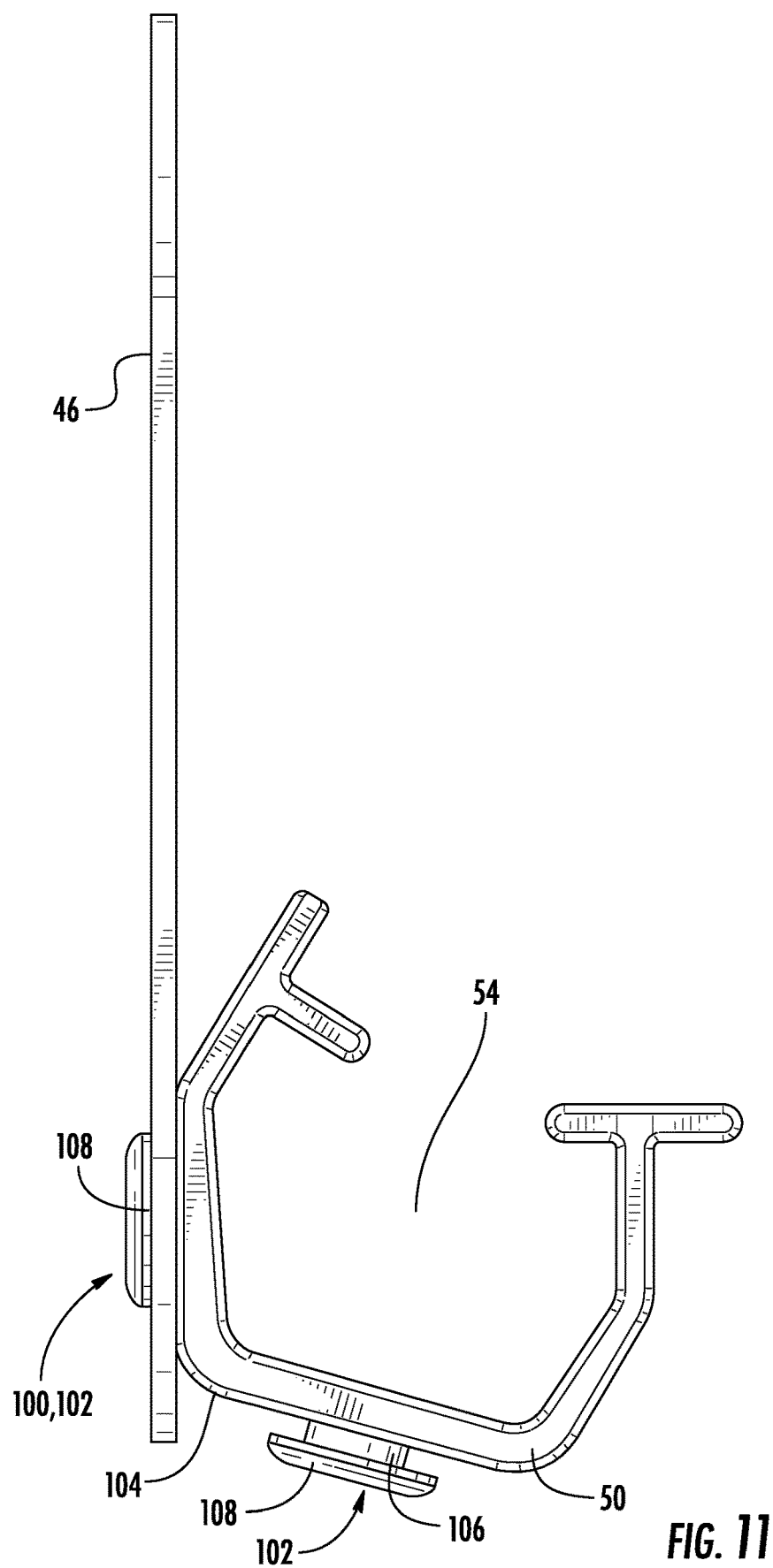
FIG. 11 is a side view of the clip assembly of FIGS. 9 and 10 according to an embodiment.

With reference now to FIGS. 9-11, another embodiment of a clip assembly 44 is illustrated. As previously described, the base plate 46 of the clip assembly 44 may be affixed to either an inner surface or an outer surface of the cover 40. In the illustrated, non-limiting embodiment, a plurality of substantially identical locking openings 100 are formed at different locations of the base plate 46. In an embodiment, the plurality of locking openings 100 span a height of the base plate 46. Although the illustrated base plate 46 includes three locking openings 100, embodiments having a single locking opening, two locking openings, or more than three locking openings formed therein are also within the scope of the disclosure.

The clip assembly 44 additionally includes a rail clip 50 having a generally curved or hook-like contour that defines a receiving chamber 54. The rail clip 50 is configured to couple to the snowmobile, such as to a bottom surface and/or outer edge 36 of a foot rail 30 of the snowmobile 10. In the illustrated, non-limiting embodiment, the rail clip 50 is a selectively connectable to the base plate 46 via at least one locking feature 102 extending from a back surface 104 of the rail clip 50. In the illustrated, non-limiting embodiment, best shown in FIG. 11, the rail clip 50 may include a plurality of substantially identical locking features 102 mounted at different locations of the back surface 104 of the rail clip 50.

As shown, the locking feature 102 includes a base 106 extending perpendicularly from the back surface 104 and a flange 108 mounted to an end of the base. In addition, each locking opening 100 is sized and shaped to cooperate with the at least one locking feature 102 extending from the rail clip 50. In the illustrated, non-limiting embodiment, each locking opening 100 includes a first hole 110 and second hole 112 arranged in a partially overlapping configuration. As shown, the second hole 112 may be disposed vertically relative to the first hole 110. A diameter of the first hole 110 is greater than the diameter of the flange 108 of the locking feature 102 and the diameter of the second hole 112 is about equal to the diameter of the base 106 of the locking feature 102.

In operation, the rail clip 50 is installed relative to the snowmobile 50. A force is then applied to the cover body 42 and the base plate 46 is coupled to the rail clip 50. The base plate 46 is coupled to the rail clip 50 by inserting one of the locking features 102 into the first hole 110 of one of the plurality of locking openings 100. The base plate 46 is then moved vertically relative to the locking feature 102 to position the base 106 of the locking feature 102 within the second hole 112. The tightness of the cover 40 about the snowmobile 10 is therefore controlled based on not only the locking feature 102 of the rail clip 50, but also the locking opening 100 formed in the base plate 46.

A cover 40 having one or more clip assemblies 44 as illustrated and described herein is installable without having to affix the cover 40 to the drive frame. As a result, installation and removal of the cover is substantially simplified and can be performed with reduced effort and time.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cover for a recreational vehicle, comprising:
   a cover body;
   at least one clip assembly affixed to the cover body, the at least one clip assembly including:
      a base plate having a first side and a second side opposite the first side;
      a rail clip arranged at the first side of the base plate, the rail clip being movable coupled to the base plate to engage a corresponding portion of the recreational vehicle; and
      a locking mechanism operably coupled to the rail clip to maintain a tension in the cover body, the locking mechanism being arranged at the second side of the base plate.

2. The cover of claim 1, wherein further comprising a webbing member extending between the rail clip and the locking mechanism.

3. The cover of claim 2, wherein the at least one clip assembly further comprises a base plate having an elongated slot, the rail clip being movable within the elongated slot.

4. The cover of claim 2, wherein a webbing opening is formed in the base plate, the webbing member extending through the webbing opening.

5. The cover of claim 2, wherein the locking mechanism includes a locking member movable relative to the base plate between a first position and a second position, wherein the locking member is operable to apply a force to the webbing member to maintain the tension in the webbing member.

6. The cover of claim 5, wherein the locking member is rotatable about an axis oriented substantially perpendicular to the elongated slot and parallel to a surface of the base plate.

7. The clip assembly of claim 6, wherein the locking member includes a cam surface.

8. The clip assembly of claim 7, wherein the cam surface applies the force to the webbing member when the locking member is in the second position.

9. The cover of claim 5, wherein the locking member is biased into engagement with the webbing member.

10. The cover of claim 1, wherein the rail clip is contoured to define a chamber for receiving a portion of a recreational vehicle.

11. A cover for a recreational vehicle, comprising:
    a cover body;
    at least one clip assembly affixed to the cover body, the at least one clip assembly including:
       a base plate having an elongated slot;
       a rail clip movable along the elongated slot to engage a corresponding portion of the recreational vehicle; and
       a locking mechanism operably coupled to the rail clip to maintain a tension in the cover body.

* * * * *